United States Patent [19]
Fan

[11] Patent Number: 6,079,061
[45] Date of Patent: Jun. 27, 2000

[54] DIVERSION DEVICE BETWEEN A FAUCET AND SHOWER HEAD

[76] Inventor: Chen-Yueh Fan, Room F/23, 4th Fl., No. 5, Sec. 5, Hsinyi Rd., Taipei, Taiwan

[21] Appl. No.: 09/262,364

[22] Filed: Mar. 4, 1999

[51] Int. Cl.$^7$ ..................................................... E03C 1/04
[52] U.S. Cl. .............................. 4/676; 4/675; 137/597; 137/125.47
[58] Field of Search .............................. 4/675, 676, 677; 137/597, 625.46, 625.47

[56] References Cited

U.S. PATENT DOCUMENTS

| | | | |
|---|---|---|---|
| 1,392,167 | 9/1921 | Johnson | 137/625.47 X |
| 1,741,521 | 12/1929 | Judell | 137/625.47 |
| 3,570,537 | 3/1971 | Kelly | 137/625.47 X |
| 4,628,962 | 12/1986 | Pezzarossi | 137/625.47 |

*Primary Examiner*—Robert M. Fetsuga
*Attorney, Agent, or Firm*—Patterson & Keough, P.A.

[57] ABSTRACT

A diversion device between a faucet and a shower head comprises a hollow assembling seat jointed by a pair of water pipes: one for cold water and the other for hot water, and is used to shut off the source water as well divert it either to a shower head or to a spout while no longer has to resist the pressure of the water therefor being light and handy in operation. The diversion device includes a perforated tube with an internal valve member having flow blocking shields mounted on the valve member.

9 Claims, 10 Drawing Sheets

Fig. 10

DIVERSION DEVICE BETWEEN A FAUCET AND SHOWER HEAD

FIELD OF THE INVENTION

The invention relates to an improved diversion device between a faucet and a shower head, which not only is able to shut off the water but also to divert the direction of water flow, either to a shower head or a spout, and which has an enhanced shut-off effect and prolonged service life.

BACKGROUND OF THE INVENTION

The common-used bathroom shower device usually comprises three main parts: a shower head, a shower-divert device and a spout. The shower-divert device connects two source water pipes: one for the hot-water and the other for the cold, and its function is expected to be able to not only shut off, but also divert the water, either to the shower head or to the spout. Such shower-divert devices in the present market could be divided into two main varieties: double-knobbed and uni-handled. Though much easier to operate, the later has its defects such as:

a) it is much more expensive;

b) it is so complex in structure that when inoperative, it has to be repaired by professionals, which means higher maintenance costs;

c) most uni-handled shower-diverts device are made of fine porcelain which is easier to be damaged by low quality water, in this case, the conventional rubber seal is not only much cheaper, but also much safer; and, d) since it has been on the market for a very short time, its components are under standardized and it may be difficult to find repair parts.

It will be very useful if a high control efficiency double-knobbed shower divert device could be developed.

SUMMARY OF THE INVENTION

The main objective of the invention is to provide an improved diversion device which can shut off the water as well divert it to either a shower head or a spout without having to resist the pressure of the water therefor being light and handy in operation.

The other objective of the invention is to provide an improved diversion device which can continue to provide the water at the previous temperature after the shower divert is shut off.

DESCRIPTION OF THE PREFERRED EMBODIMENT

Figure 1:
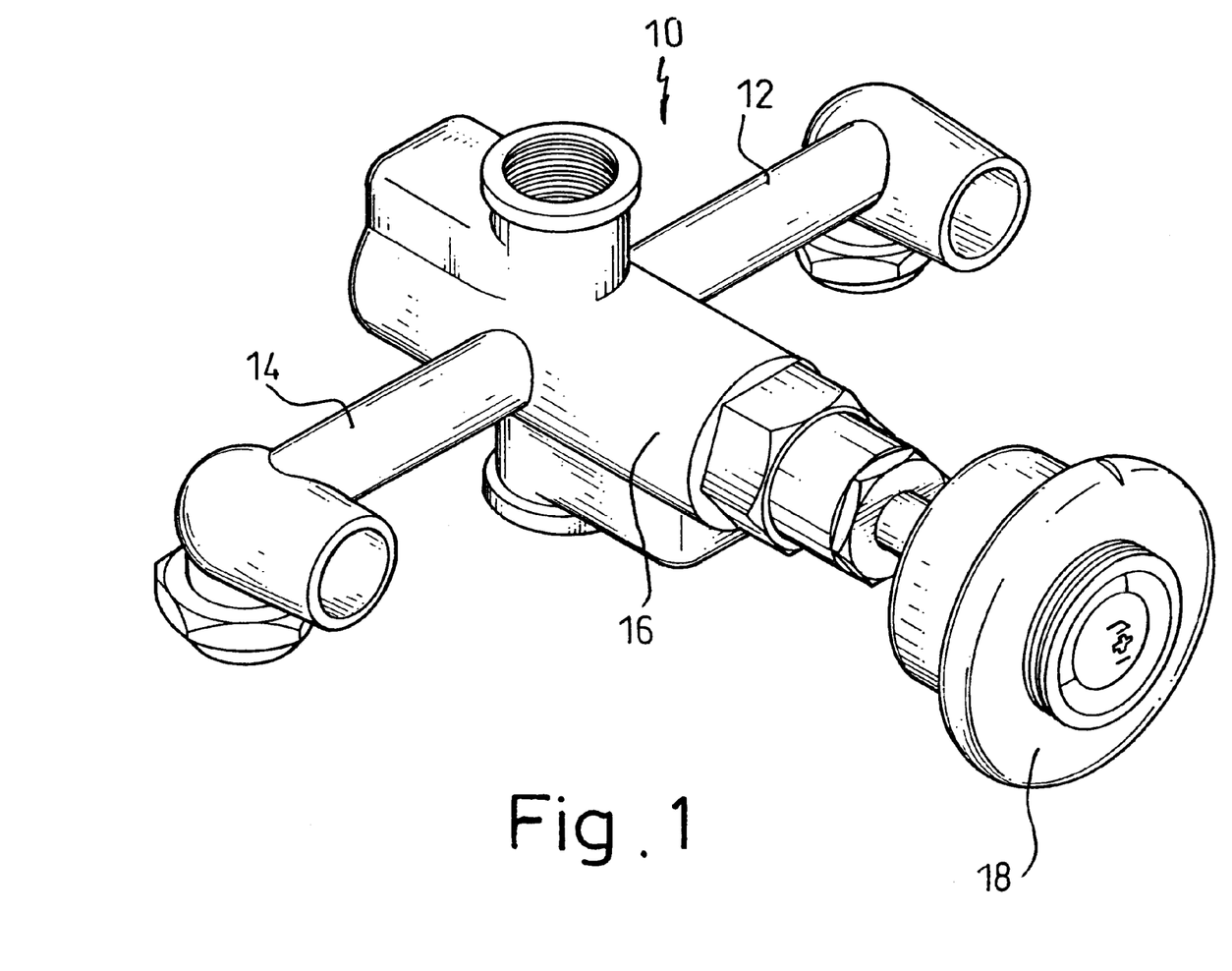
FIG. 1 is a perspective view of a preferred embodiment of the present invention.

FIG. 1 is a preferred embodiment of a diversion device. Like a conventional diversion device, the present invention connects two source water pipes: one (14) for the hot water and the other (12) for the cold. The two pipes join to a central housing (16). On the front of the housing (16) is a knob (18) which is use to control the flow of or to divert the water to either the shower head or to the spout.

Figure 2:
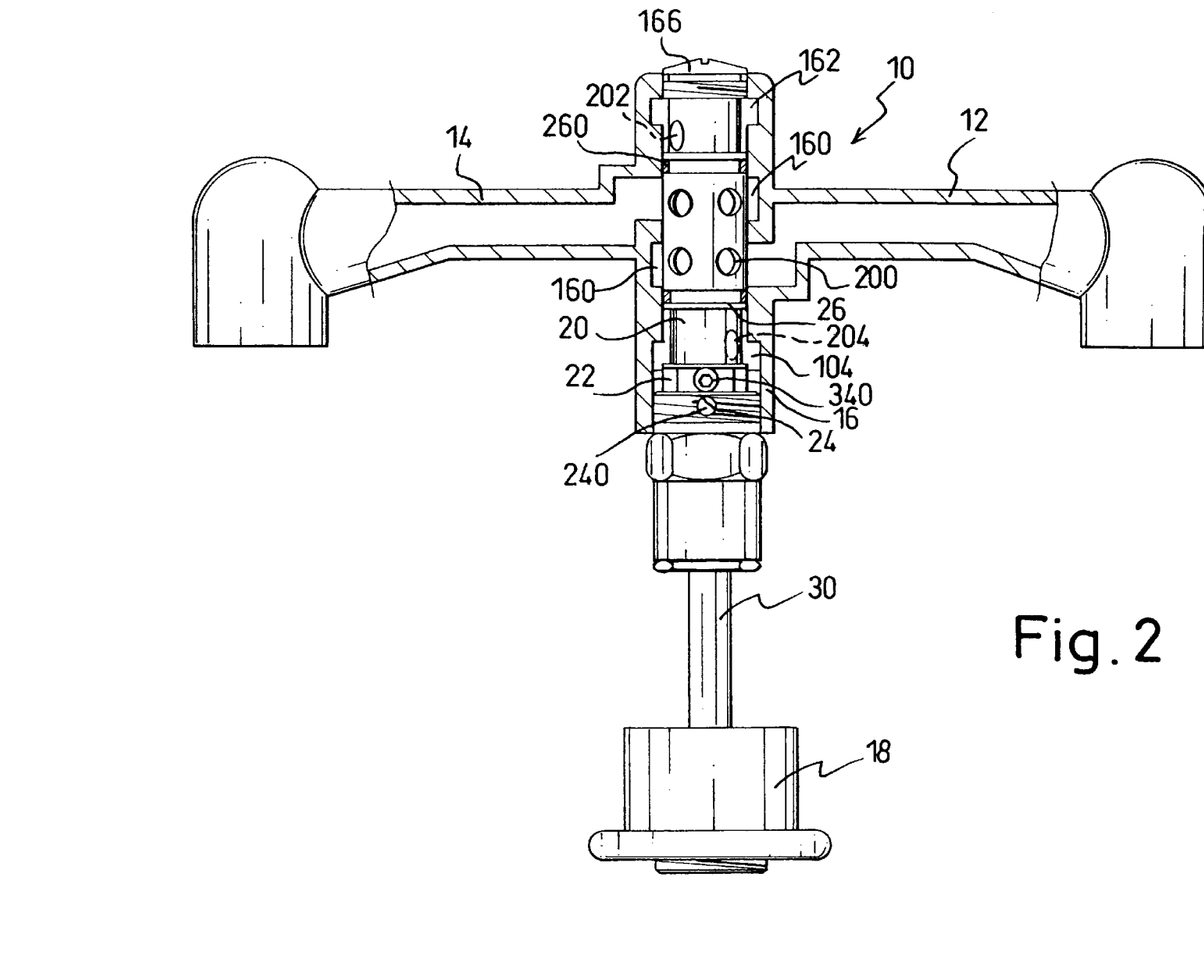
FIG. 2 is a top view in partial section of the device in FIG. 1.
Figure 3:
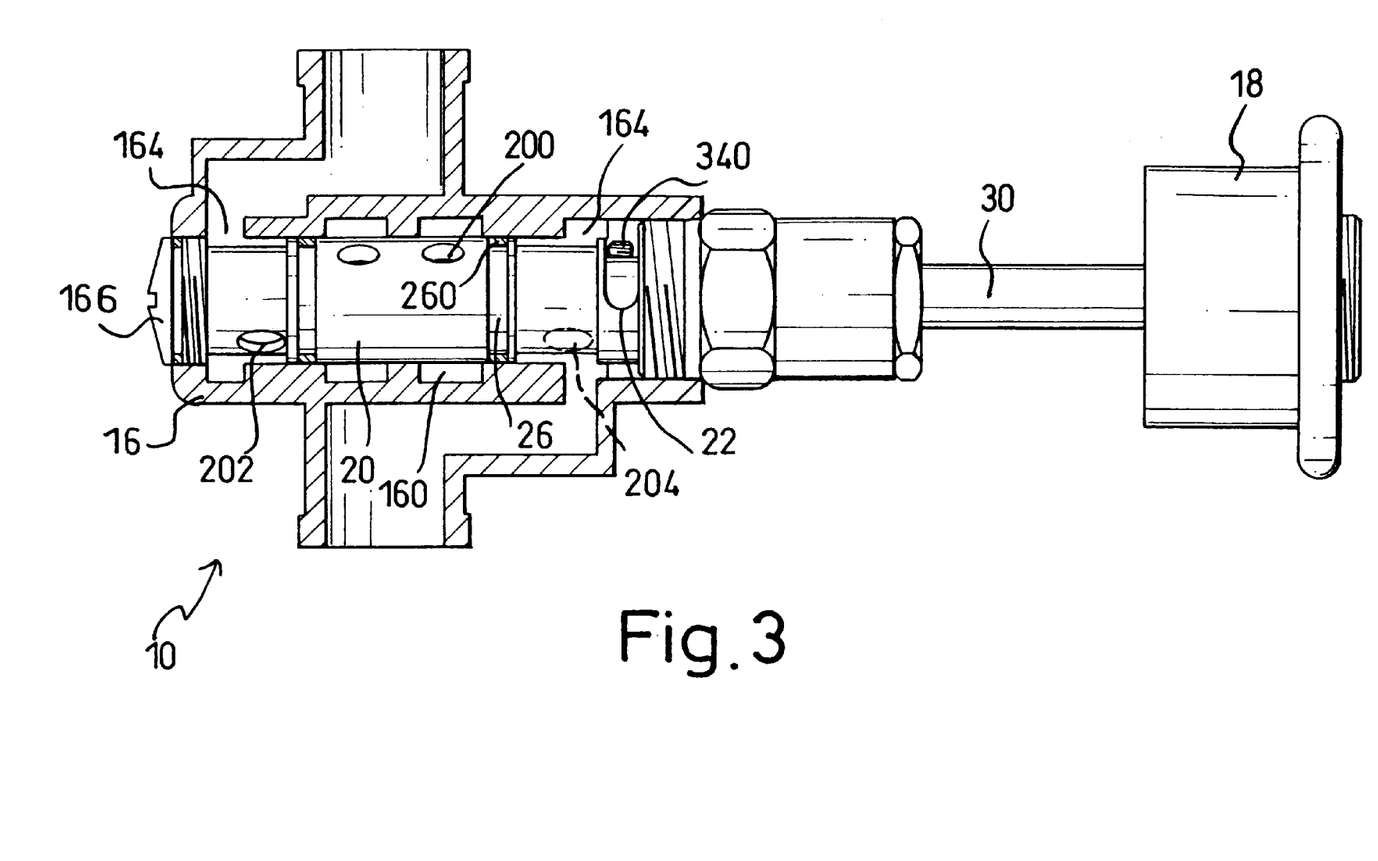
FIG. 3 is a side view in partial section of the device in FIG. 1.

With reference to FIG. 2, the inner structure of the housing (16) is shown. A diversion tube (20) is held within the housing (16) with a watertight fit. The inner chamber of the housing (16) is divided into four sections by the diversion tube (20) and corresponding walls: an upper outlet chamber (162), two inlet chambers (160) and a lower outlet chamber (164). The four chambers are separated by two O-rings (260) respectively installed in two grooves (26) so that the water can not flow within the space defined by the housing's (16) inner surface and the diversion tube's (20) outer surface. The upper outlet chamber (162) is connected to the shower head (not shown) and the lower outlet chamber (164) is connected to the spout (now shown). In the diversion tube (20), corresponding to each above-mentioned three sections, there are an upper outlet hole (202), a plurality of inlet holes (200) and a lower outlet hole (204).

Figure 4:
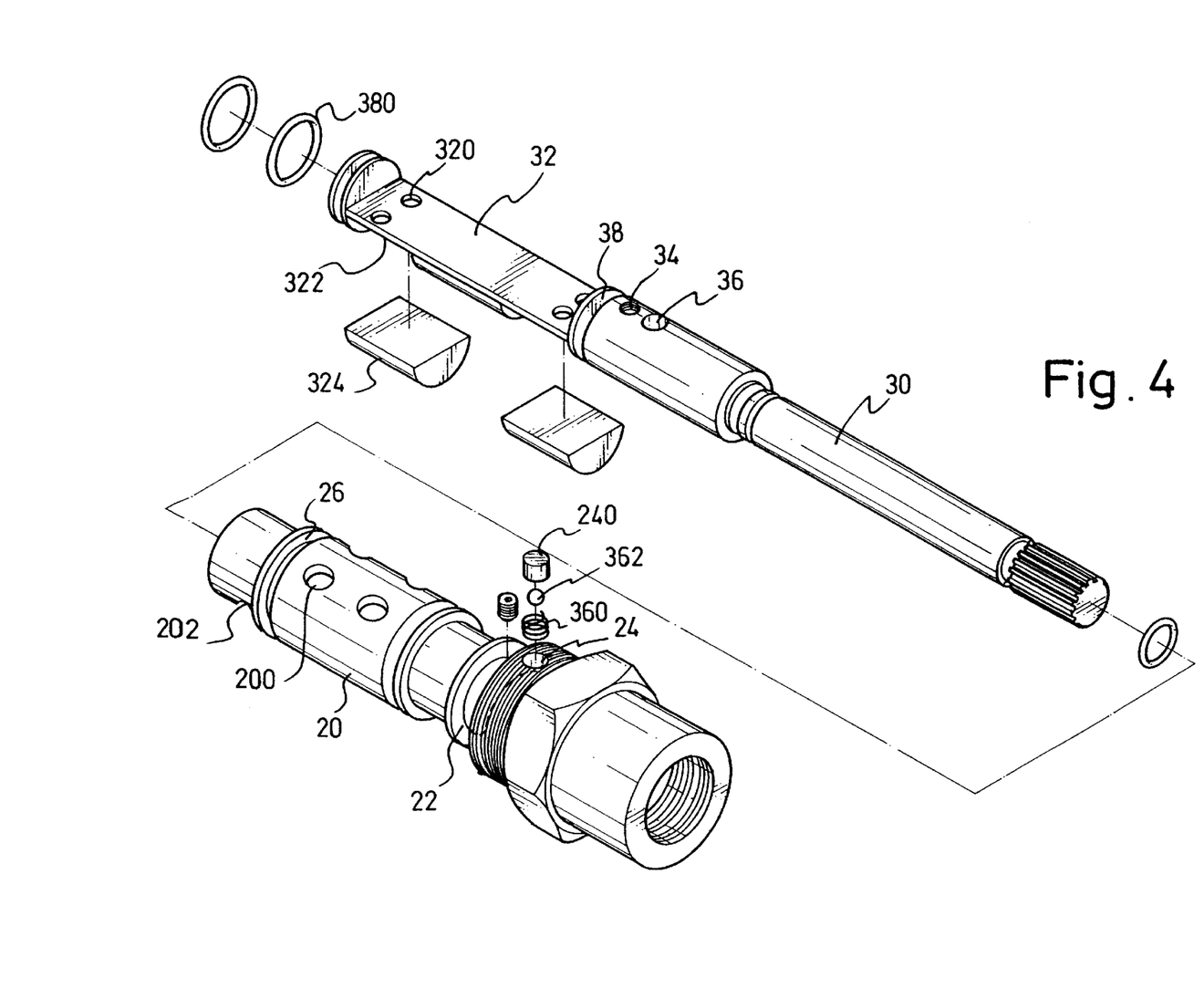
FIG. 4 is an exploded perspective view of a diversion tube and a control shaft of the device in FIG. 1.

FIG. 4 shows the diversion tube (20), the control shaft (30) and their relationship. Defined in the diversion tube 20 are a shoot opening (22) and a first threaded locking hole (24). The control shaft (30) is rotatably inserted into the diversion tube (20) with the watertight fit maintained by two O-rings (380) each mounted in a groove (38) respectively. Provided between the bases of said two grooves (38) and aligned with the inlet holes (200) and either the upper outlet (202) or lower outlet (204) holes defined in the diversion tube (20) is an aqueduct (32). This aqueduct (32) is defined by a thin rectangular plate connected to a diameter of said groove bases respectively. A semicircular cross section shielder (324) is attached on the plate's back surface, and here in this embodiment it is attached by a plurality of receiving openings (320).

Longitudinally corresponding to the shoot opening (22), an opening (34) is defined in the control shaft (30) for receiving a stop bolt (340) which limits the control shaft's rotation with respect to the diversion tube (20). Corresponding to the first locking hole (24), a second opening (36) is defined in the control shaft (30). When the diversion tube (20) and the control shaft (30) are assembled together, a spring (360) and a positioning ball (362) are put into the two aligned openings (24, 36) and are sealed therein by a plug (240).

Figure 5:
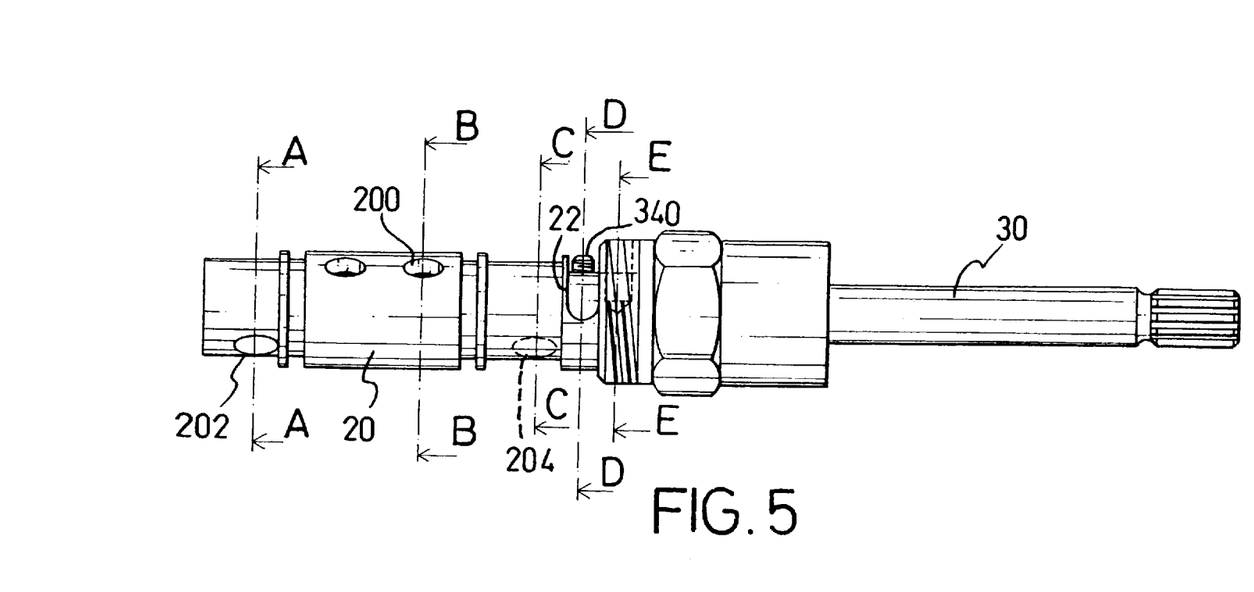
FIG. 5 is a side plan view of the diversion tube and the control shaft.
Figure 6:
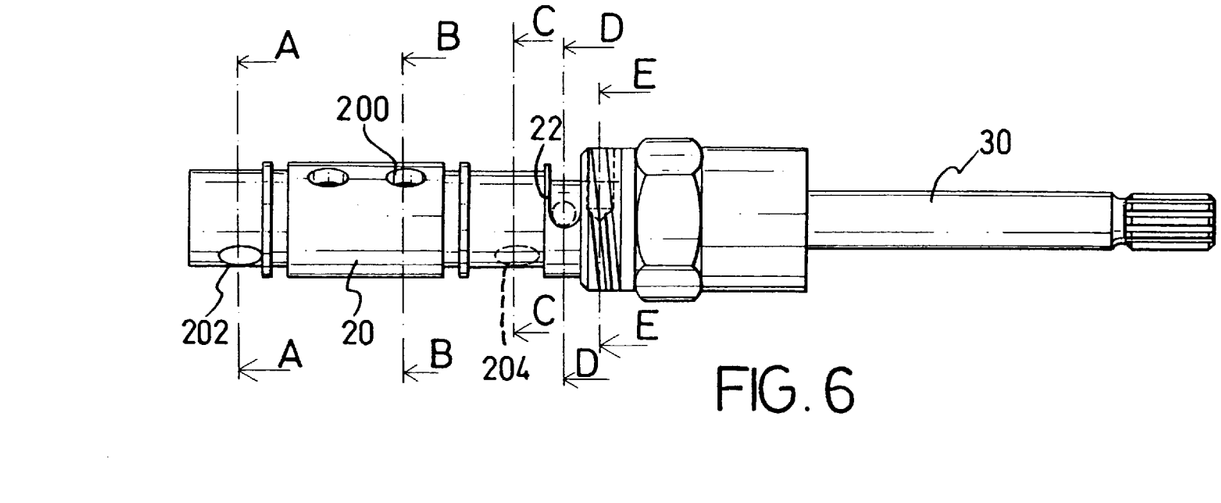
FIG. 6 is a side plan view of the division tube and the control shaft.
Figure 7:
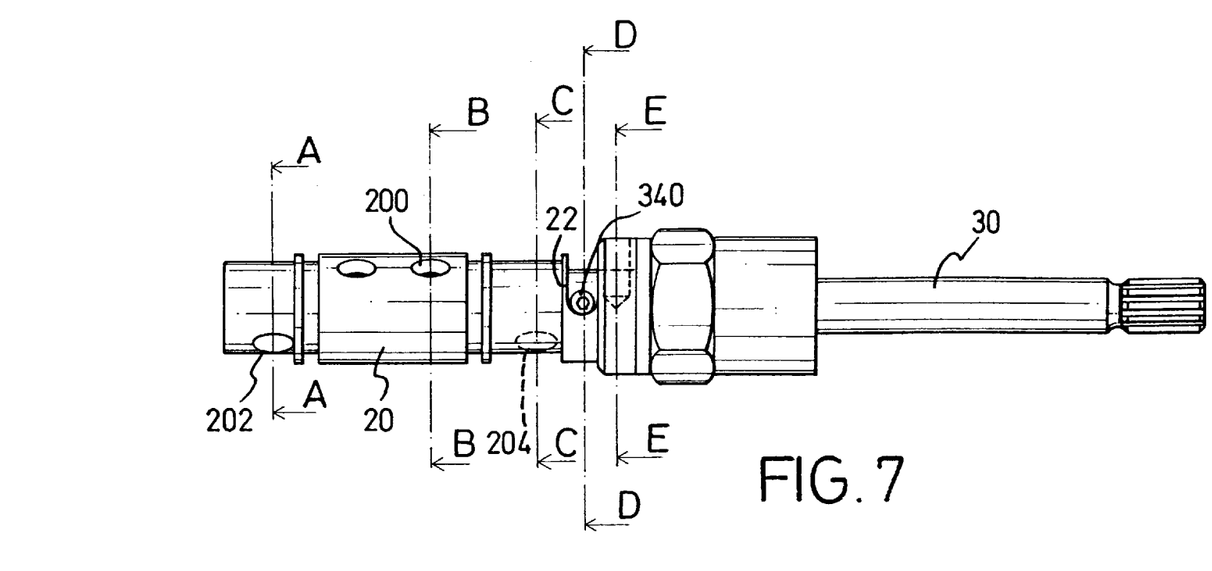
FIG. 7 is a side plan view of the division tube and the control shaft

FIGS. 5, 6 and 7 show relative positions of the control shaft (30) and the division tube (20) when the control shaft (30) is aligned to perform the three functions: "shut", divert to "spout" and divert to "shower head", respectively. In FIG. 5, the side view of the assembled diversion tube (20) and control shaft (30), together with accompanying cross sections from five different positions, shows the situation when the control shaft (30) is turned to "shut".

Figures 5A, 5B:
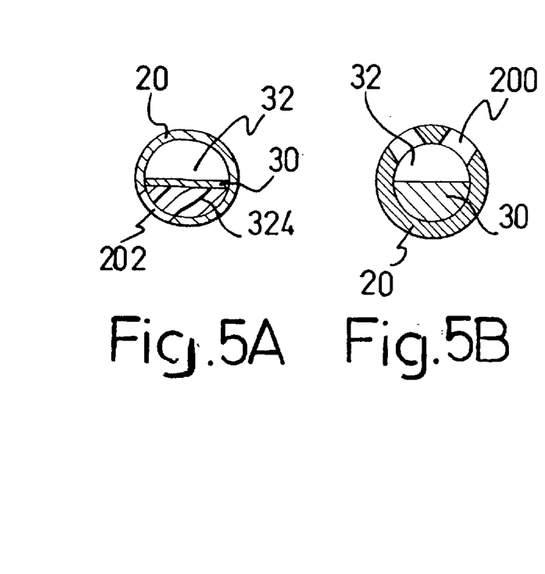
FIGS. 5A–5E are cross sections when the device in FIG. 1 is in the OFF position.
Figure 5C:
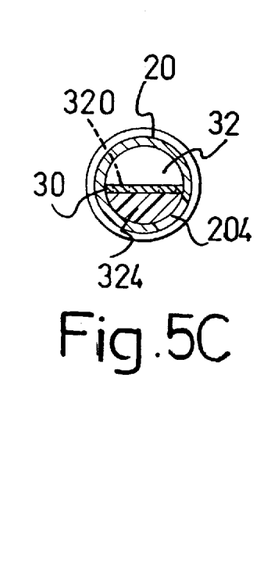
Figure 5D:
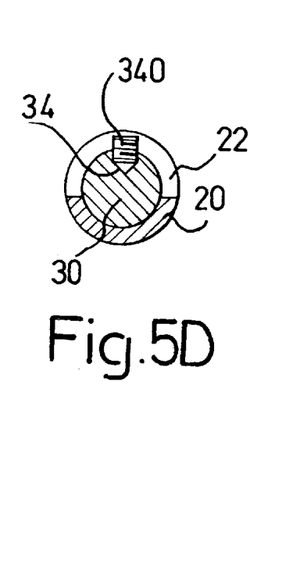
Figure 5E:
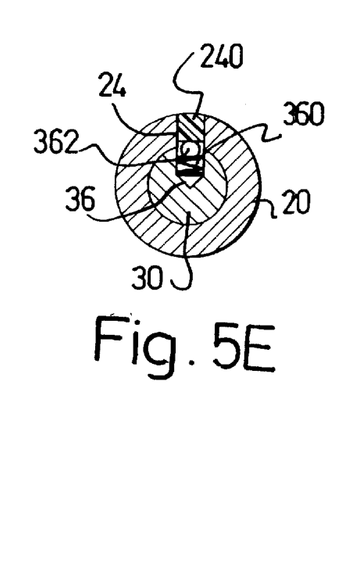

FIG. A—A shows that the upper outlet hole (202) in the diversion tube (20) is closed by the shield (324);

FIG. B—B shows that the inlet holes (200) in the diversion tube (20) are open to the aquaduct (32);

FIG. C—C shows that the lower outlet hole (204) in the diversion tube (20) is also closed by the shield (324);

FIG. D—D shows that the stop bolt (340) is at the center of the shoot opening (22), and it can be turned to left or right; and, FIG. E—E shows that under the force of the spring (360), the positioning ball (362) is pushed into a space of a certain depth left by the plug (240) thus providing a positioning force on the control shaft (30) with respect to the diversion tube (20).

Under these conditions, all the outlet holes are closed so the shower-divert is "shut off".

In FIG. 6, the control shaft is turned to the position of "spout".

Figures 6A, 6B:
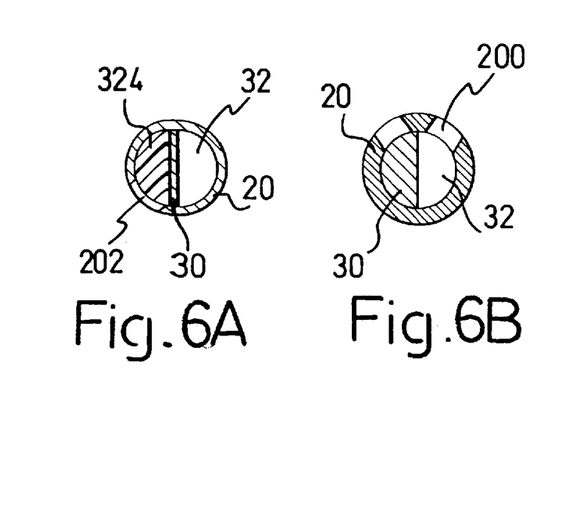
FIGS. 6A–6E are cross sections when the control shaft diverts water to the spout.
Figure 6C:
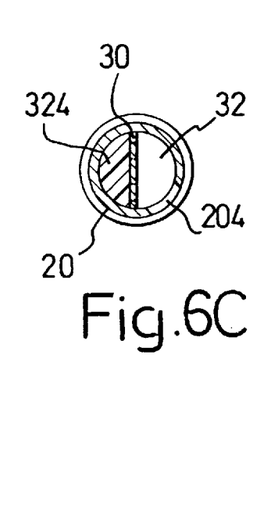
Figure 6D:
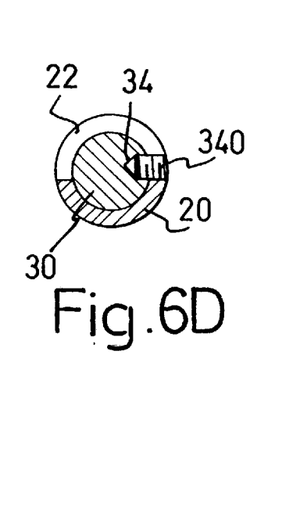
Figure 6E:
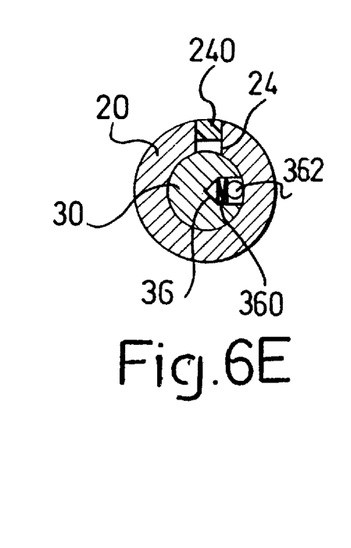

FIG. A—A shows that the upper outlet hole (202) in the diversion tube (20) is closed by the shield (324);

FIG. B—B shows that the inlet holes (200) in the diversion tube (20) are open;

FIG. C—C shows that the lower outlet hole (204) is also open;

FIG. D—D shows that the stop bolt (340) is at the right most end of the stop groove (22), a position easy to identify by a user;

FIG. E—E shows that the spring (360) is compressed and the positioning ball (362) is pushed by the spring against the inner surface of the diversion tube.

Under these conditions, the inlet hole (200) and the lower outlet hole (204) which connects to the lower outlet chamber (164) which connects to the pipe leading to the spout is open yet the upper outlet hole (202) is closed, so the source water will be diverted to the spout.

In FIG. 7, the control shaft 30 is turned to the position for "shower head".

Figure 7A:
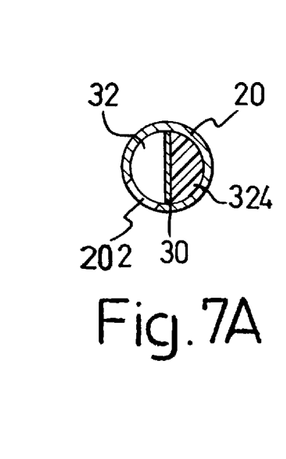
FIGS. 7A–7E are cross sections when the control shaft diverts water to the shower head.
Figure 7B:
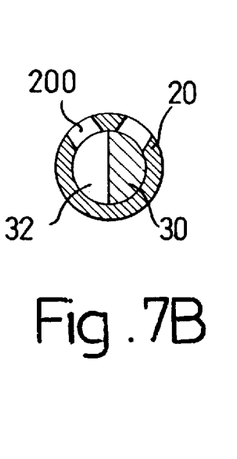
Figure 7C:
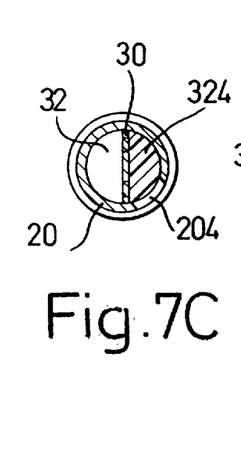
Figure 7D:
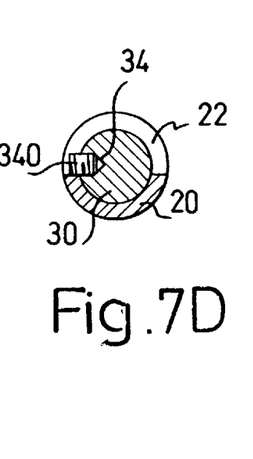
Figure 7E:
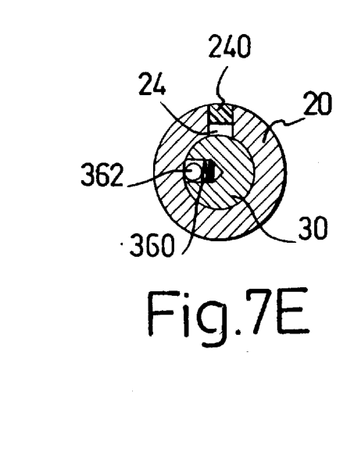

FIG. A—A shows that the upper outlet hole (202) in the diversion tube 20 is open;

FIG. B—B shows that the inlet hole (200) in the diversion tube (20) is open;

FIG. C—C shows that the lower outlet hole (204) is closed by the shield (324);

FIG. D—D shows that the stop bolt (340) is at the left most end of the shoot opening (22);

FIG. E—E shows that the spring (360) is compressed and the positioning ball (362) is pushed by the spring against the inner surface of the diversion tube (20).

Figure 8:
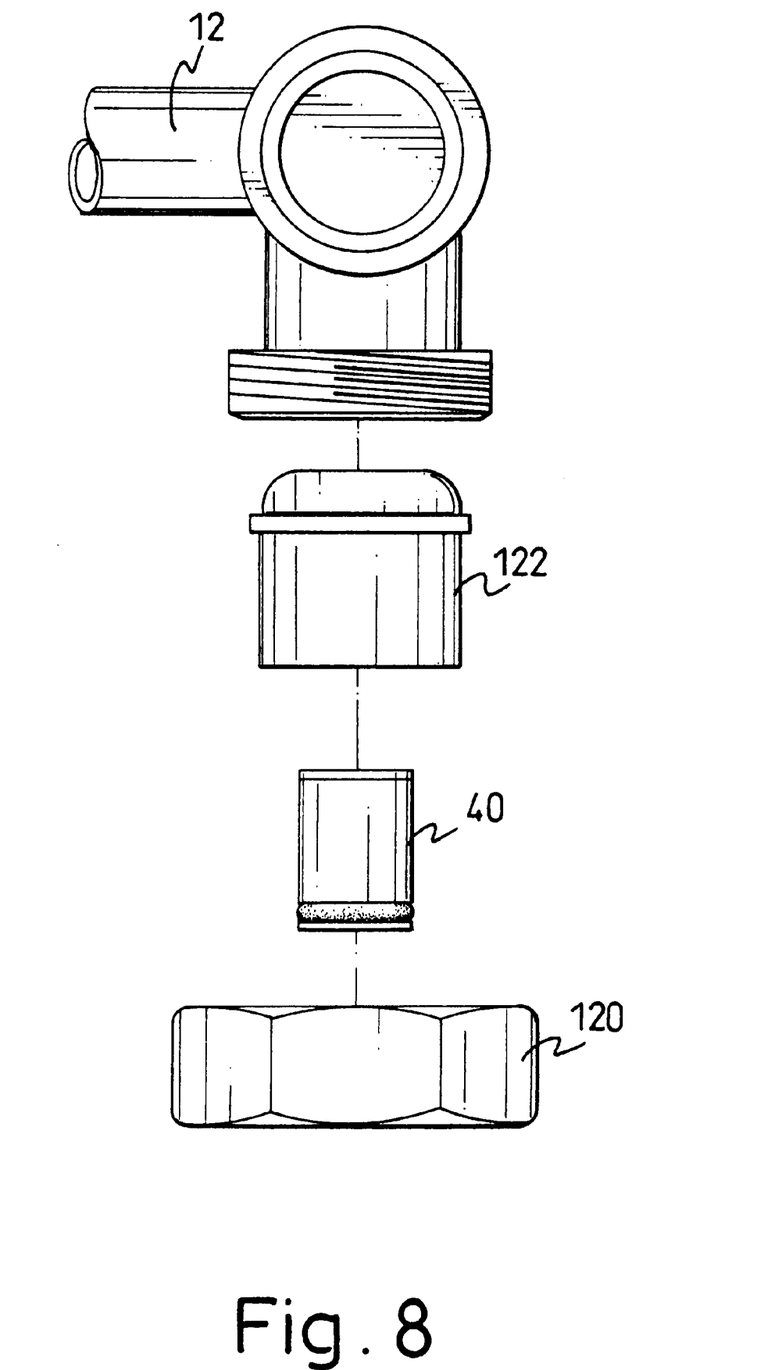
FIG. 8 is an exploded side plan view of a cut-off valve assembled at the inlet of the source water in accordance with the present invention.
Figure 9:
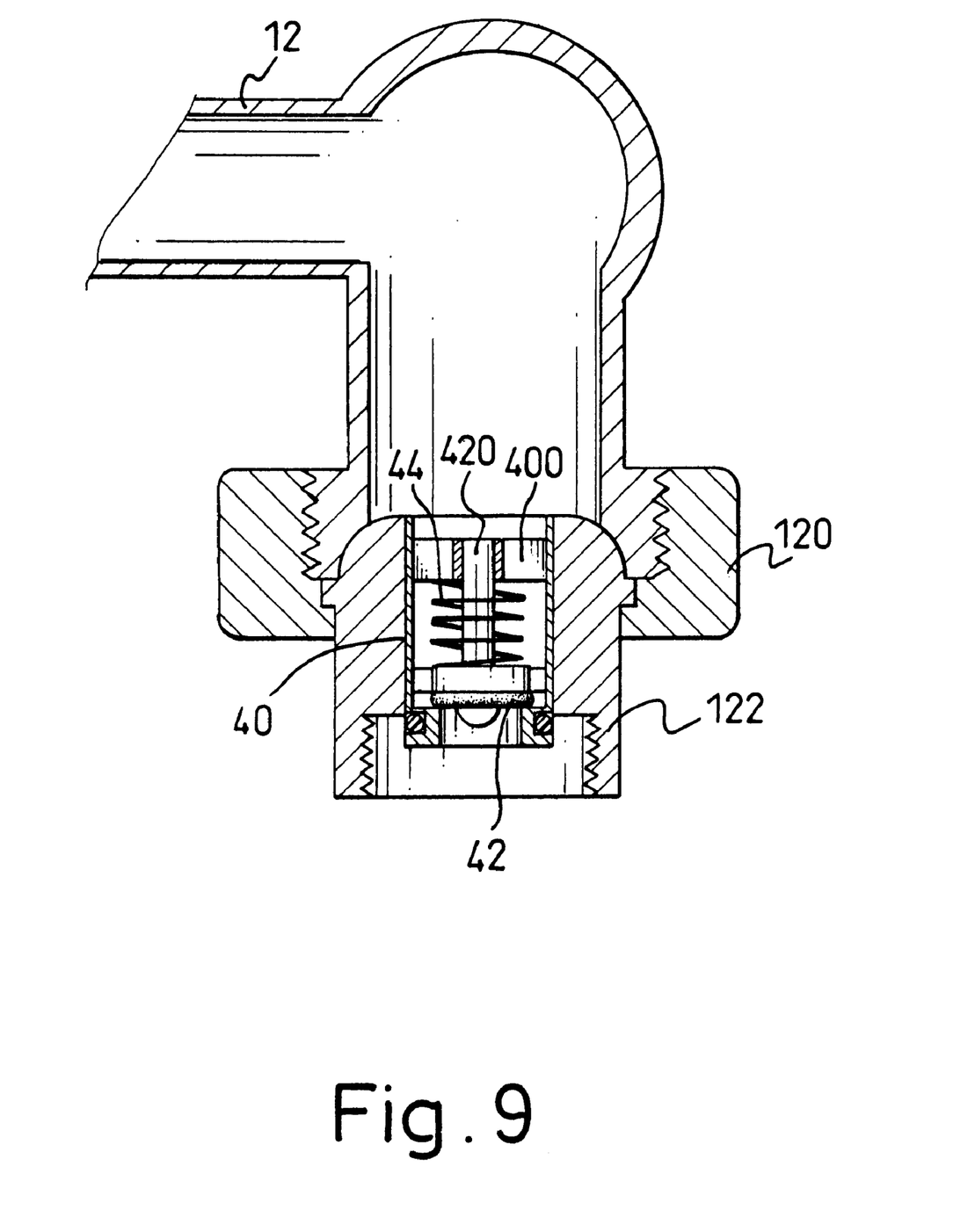
FIG. 9 is a side plan view in partial section of the cut-off valve shown in FIG. 8.
Figure 10:
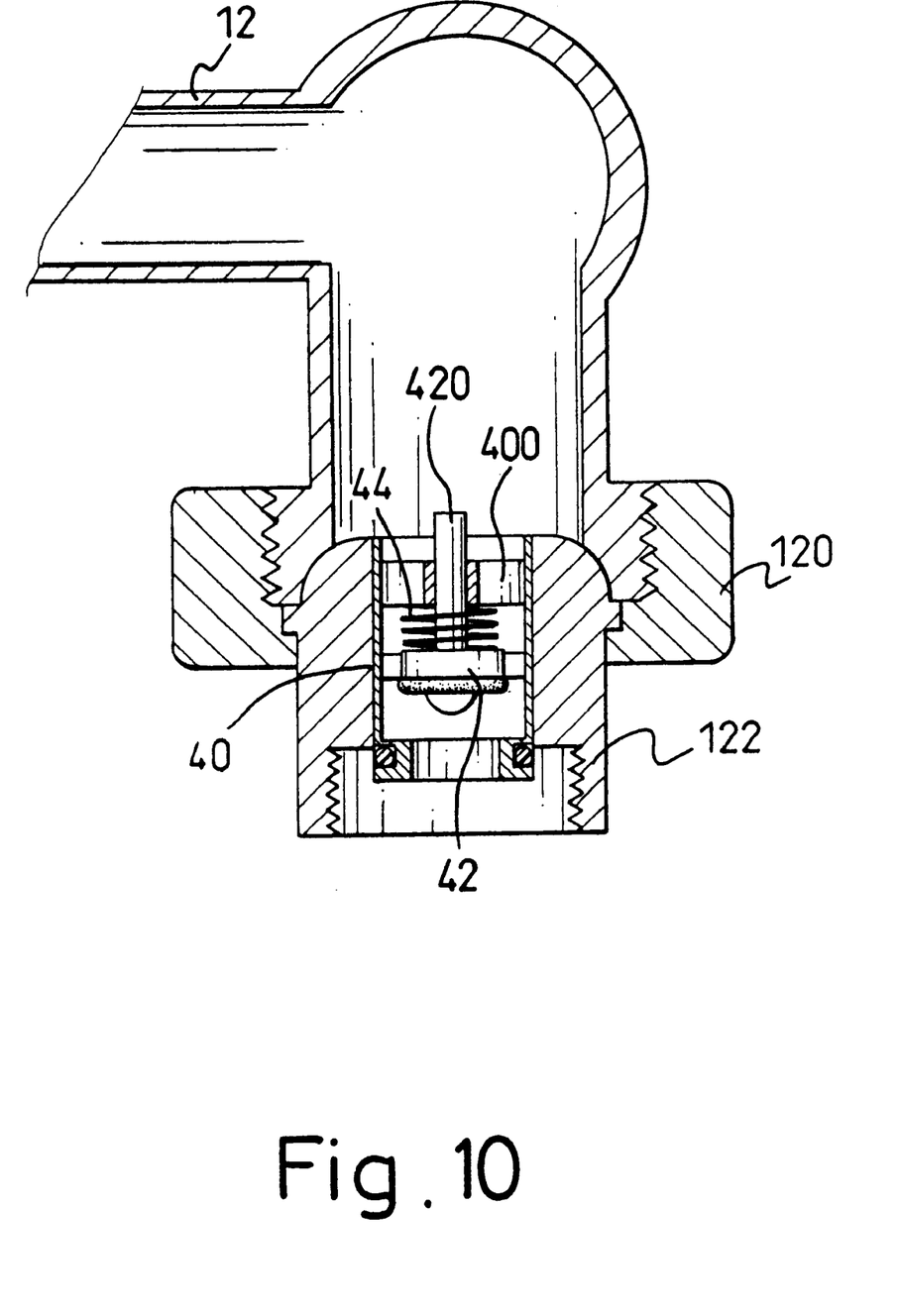
FIG. 10 is a side plan view in partial section of the cut-off valve in FIG. 8 in operation.

FIGS. 8, 9 and 10 show a cut-off valve device (40) and its principle of operation. The cut-off valve device is used between the shower-divert device (10) (shown in FIG. 1) and the water pipe (12, 14) (here the cold-water tube) to prevent flow of the water from the shower-divert device (10) back into the water pipe (12, 14) when the shower divert device (10) is shut off. FIG. 8 shows that the cut-off device comprises a cut-off valve (40) and a valve cover (122) covered thereon. With reference to FIG. 9, the cut-off valve is a small barrel-like device comprising therewithin: a hollowed-out frame (400) fixed on the inner face of the barrel with a central opening, a shaft (420) slidably inserted in said central opening, a cylinder (42) connected onto the free end of said shaft at the cylinder's center, a spring (44) covering around the shaft and fixed onto said hollowed-out frame (400) at one end and onto the cylinder (42) at the other end. When the water is shut off, the cylinder (42) will close the inlet hole defined in the bottom face, facing the side of the shower divert, of the cut-off valve device under the force of the spring thus preventing the water from flowing back into the water tube. And also with reference to FIG. 10, when the source water is turned on, the cut-off valve will open because the cylinder (42) is pushed back by the pressure of the water.

What is claimed is:

1. An improved shower-divert device comprising:

a housing joined by two water pipes, one for hot water and one for cold;

a diversion tube provided within said housing;

an inlet chamber, an upper outlet chamber and a lower outlet chamber, defined by said housing's inner surface, said diversion tube's outer surface and walls therebetween;

a plurality of holes corresponding to said three chambers defined in the diversion tube comprising, inlet holes, an upper outlet hole and a lower outlet hole;

a control shaft rotatably provided within said diversion tube with a watertight fit;

an aqueduct defined in said control shaft corresponding to said holes;

a semicircular cross section shield formed on the back of said aqueduct; and, in operation, by turning said control shaft, the shield is able to close said upper outlet hole and lower outlet hole, either simultaneously or respectively, to shut off the source water or divert it to a certain said chamber.

2. The shower-divert device as described in claim 1, wherein said three chambers are circular and the holes are at variety of degrees on the periphery of the diversion tube.

3. The shower-divert device as described in claim 1 or 2, wherein said upper outlet chamber may be connected to a pipe that leads to a shower head, and said lower outlet chamber may be connected to another pipe that leads to a spout.

4. The improved shower-divert device as described in claim 1, wherein said three chambers are separated by two O-rings each mounted in a groove defined on the diversion tube respectively to prevent the water from flowing within the space defined by said housing's inner face and the diversion tube's outer surface.

5. The shower-divert device as described in claim 1, wherein there is a shoot opening defined in the diversion tube and longitudinally corresponding to said shoot opening an opening is defined in the control shaft which after the diversion tube and the control shaft are assembled together, can restrict the control shaft's rotational scope with respect to the diversion tube by a stop bolt.

6. The shower-divert device as described in claim 1, wherein a first locking hole and a corresponding second positioning opening are defined in the diversion tube and the control shaft with a spring and a positioning ball are put into the aligned said two openings and then sealed therewithin by a plug; and in combination provide the control shaft a position indication function.

7. The shower-divert device as described in claim 1, wherein said shield is attached on the back of said aqueduct by a plurality of receiving openings.

8. The shower-divert device as described in claim 1, wherein said control shaft is rotatably yet held watertight within the diversion tube by two O-rings provided around grooves respectively at its two ends.

9. The shower-divert device as described in claim 1, wherein a cut-off valve is provided between the shower-divert device and each water pipes.

* * * * *